US007012229B2

(12) United States Patent
Kim

(10) Patent No.: US 7,012,229 B2
(45) Date of Patent: Mar. 14, 2006

(54) VACUUM COOKING APPARATUS AND COOKING METHOD USING THE SAME

(75) Inventor: Cheol Jin Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/801,855

(22) Filed: Mar. 17, 2004

(65) Prior Publication Data

US 2005/0051541 A1 Mar. 10, 2005

(30) Foreign Application Priority Data

Sep. 9, 2003 (KR) ..................... 10-2003-0063011

(51) Int. Cl.
*H05B 6/68* (2006.01)
*F25B 29/00* (2006.01)

(52) U.S. Cl. .......................... 219/686; 99/470; 99/472; 165/64; 219/703; 219/720

(58) Field of Classification Search ................ 219/686, 219/720, 702–704, 401; 165/61, 64, 918, 165/919; 62/100, 268, 169, DIG. 7; 99/470, 99/472, 355; 426/243

See application file for complete search history.

(56) References Cited

U.S. PATENT DOCUMENTS

| | | | | |
|---|---|---|---|---|
| 2,504,794 | A | | 4/1950 | Berman et al. |
| 2,696,775 | A | * | 12/1954 | Dean .......................... 99/355 |
| 3,353,476 | A | * | 11/1967 | Goodman et al. ............ 99/328 |
| 3,470,942 | A | * | 10/1969 | Fukada et al. .............. 165/919 |
| 3,536,129 | A | * | 10/1970 | White ........................ 219/703 |
| 4,331,690 | A | * | 5/1982 | Bradshaw ................... 426/233 |
| 4,430,557 | A | * | 2/1984 | Eichelberger et al. ...... 219/401 |
| 4,884,626 | A | * | 12/1989 | Filipowski .................. 165/231 |
| 5,088,293 | A | * | 2/1992 | Itou ............................ 99/472 |
| 5,334,402 | A | * | 8/1994 | Ovadia ....................... 426/241 |
| 6,121,593 | A | * | 9/2000 | Mansbery et al. .......... 219/720 |
| 6,197,358 | B1 | * | 3/2001 | Bunker ....................... 426/457 |
| 6,244,165 | B1 | * | 6/2001 | Trombley et al. ............. 99/470 |
| 6,497,276 | B1 | * | 12/2002 | Clark et al. ................. 165/206 |
| 6,831,254 | B1 | * | 12/2004 | Barritt ........................ 219/394 |
| 2003/0070789 | A1 | * | 4/2003 | Mueller et al. ............... 165/61 |
| 2003/0213792 | A1 | * | 11/2003 | Bellassai et al. ............ 219/401 |

* cited by examiner

*Primary Examiner*—Teresa J. Walberg
(74) *Attorney, Agent, or Firm*—Staas & Halsey LLP

(57) ABSTRACT

A vacuum cooking apparatus and cooking method using the vacuum cooking apparatus, which automatically performs cold storage, thawing, cooking, and warming functions in a single cooking apparatus, thus improving cooking convenience. In the cooking method, a temperature of a cooking cavity is decreased by creating a vacuum state in the cooking cavity for a preset period in response to a cold storage signal, thus performing a cold storage mode that allows food to be stored at a low temperature. The cold storage mode is terminated after the preset period has elapsed, and then a cooking mode is performed by heating the food.

24 Claims, 4 Drawing Sheets

VACUUM COOKING APPARATUS AND COOKING METHOD USING THE SAME

CROSS-REFERENCE TO RELATED APPLICATIONS

This application claims the benefit of Korean Patent Application No. 2003-63011, filed Sep. 9, 2003 in the Korean Intellectual Property Office, the disclosure of which is incorporated herein by reference.

BACKGROUND OF THE INVENTION

1. Field of the Invention

The present invention relates, in general, to a vacuum cooking apparatus and a cooking method using the vacuum cooking apparatus, and more particularly, to a vacuum cooking apparatus and cooking method using the vacuum cooking apparatus, which perform cold storage, thawing, cooking, and warming functions.

2. Description of the Related Art

Generally, a cooking apparatus using microwaves is a device that generates microwaves to oscillate water molecules within food, and cooks the food using friction between the water molecules due to the oscillation, when a user places the food in a cooking cavity, selects a cooking type and a cooking time, and then presses a start button. In the cooking apparatus, an intensity of the microwaves, generated by a magnetron, is determined according to characteristics of food to be cooked.

That is, because factors, such as a material and a shape of food placed in the cooking cavity, determine an absorption rate of the microwaves and an intensity of energy, the cooking apparatus using the microwaves performs cooking after checking cooking information on food, which is input by the user.

A conventional cooking apparatus using microwaves includes a body, a cooking cavity to cook food, and an electrical component area to accommodate various electrical components therein, with the body, the cooking cavity, and the electrical component area partitioned by a plurality of panels.

The cooking cavity is selectively opened and closed by a door, and a cooking tray is seated on a center portion of a bottom of the cooking cavity to hold the food during cooking.

Further, in the electrical component area, there are various devices, such as a magnetron to generate the microwaves, which radiate onto the food placed in the cooking cavity. A cooling fan is installed to prevent overheating of the electrical components.

On a front of the electrical component area, there is an input unit provided with a plurality of operational buttons, to allow the user to input cooking conditions just before cooking.

A microcomputer, which is used to control a cooking operation of the cooking apparatus, controls a suitable cooking function based on the cooking information input through the input unit.

Meanwhile, in the case where food is seated on the cooking tray in the cooking cavity, a cooking function is selected by the input unit, and then the food is cooked. The food may be cooked after the cooking information is collected in such a way that cooking conditions, such as a weight or a state of the food, are input by the user, or are measured by a variety of sensors mounted in the cooking apparatus.

Generally, in the cooking apparatus using the microwaves, cooking times and cooking methods according to weights or other information are prestored with respect to various types of foods, and cooking is performed based on the weights or other information.

For example, if a pop corn cooking function, is selected by the user, information on whether a weight of popcorn is large or small is input by the user, and the microcomputer of the cooking apparatus performs suitable cooking depending on the weight information received through a control panel at the time of pop corn cooking. As another example, if a thawing function is selected, information on a type of food to be thawed (such as information indicating whether the food to be thawed is meat, fish or another food) is input by the user, and then the cooking function is performed according to the input information.

For the cooking apparatus using the microwaves, if the food is stored in a refrigerator in a frozen state, the user takes out the food from the refrigerator, places the food in the cooking apparatus to be thawed, and then inputs cooking conditions (a cooking time, a food type, etc.) to perform the cooking. Further, the user consumes the cooked food after the cooking has been completed, and places the remaining food in the refrigerator again, to store the remaining food therein.

As described above, the conventional cooking apparatus is problematic in that, to perform cooking, the user must move the food stored in the refrigerator into the cooking apparatus immediately before the cooking starts. On the other hand, the user must move cooked food into the refrigerator to store the cooked food in the refrigerator, in case the user does not immediately consume the cooked food after the cooking has been completed.

Moreover, the conventional cooking apparatus is problematic in that the user must wait for a long time in the case of food requiring a long time to cook.

SUMMARY OF THE INVENTION

Accordingly, it is an aspect of the present invention to provide a vacuum cooking apparatus and cooking method using the vacuum cooking apparatus, which automatically performs cold storage, thawing, cooking and warming functions in a single cooking apparatus, thus increasing cooking convenience. The vacuum cooking apparatus and cooking methods also automatically perform a delayed cooking operation at a predetermined time, and thus, a user does not have to wait for a long time to perform cooking requiring a long time.

Additional aspects and/or advantages of the invention will be set forth in part in the description which follows and, in part, will be obvious from the description, or may be learned by practice of the invention.

The above and/or other aspects are achieved by providing a cooking method using a vacuum cooking apparatus, including decreasing a temperature of a cooking cavity by creating a vacuum state in the cooking cavity for a predetermined period in response to a cold storage signal, thus performing a cold storage mode to store food at a predetermined temperature, and terminating the cold storage mode after the predetermined period has elapsed, and performing a cooking mode by heating the food.

Additionally, the above and/or other aspects are achieved by providing a cooking method using a vacuum cooking apparatus, including determining whether cooked food is present in a cooking cavity after a cooking mode has been completed and a predetermined period has elapsed, and decreasing a temperature of the cooking cavity by creating a vacuum state in the cooking cavity when the cooked food is present in the cooking cavity after the predetermined period has elapsed, thus performing a cold storage mode to store the cooked food at a predetermined temperature.

Further, the above and/or other aspects are achieved by providing a vacuum cooking apparatus having a cooking cavity to cook food, a heating unit to heat food, a vacuum unit to create a vacuum state in the cooking cavity, and a control unit to perform a cooking mode by controlling the heating unit, and perform a cold storage mode by controlling the vacuum unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
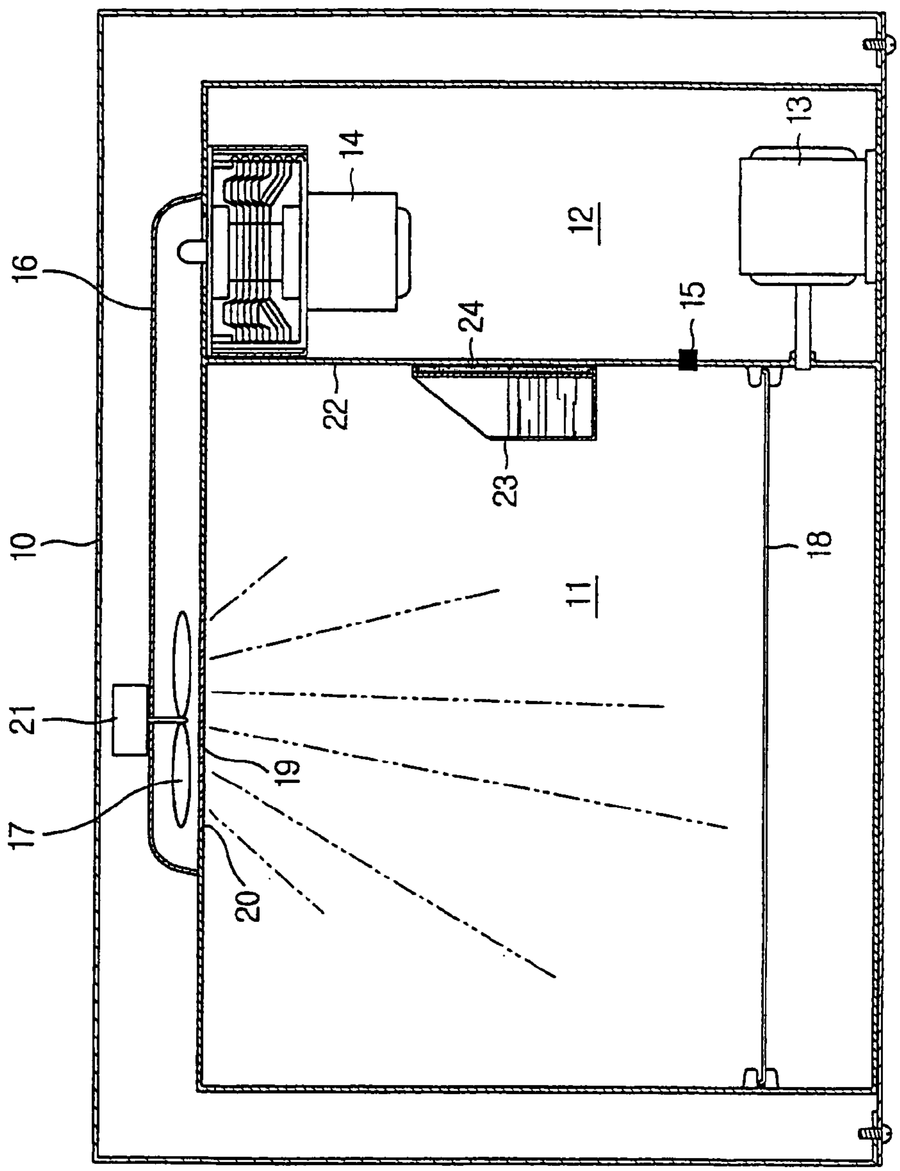
FIG. 1 is a front sectional view of a vacuum cooking apparatus, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

With reference to FIG. 1, a vacuum cooking apparatus according to an embodiment of the present invention is described. The vacuum cooking apparatus includes a body 10, and a cooking cavity 11 positioned in the body 10. A food support 18 is mounted in a lower portion of the cooking cavity 11 to allow food to be seated thereon. Further, the food support 18 is inserted into opposing grooves positioned in mounting members attached to opposing side walls of the cooking cavity 11, thus slidably moving forward and backward along the grooves.

A microwave supply hole 20, which is covered with a ceramic cover 19, is positioned in a top of the cooking cavity 11 to supply microwaves into the cooking cavity. A waveguide 16 is connected to the microwave supply hole 20, to guide the microwaves generated by a magnetron 14 into the microwave supply hole 20. And a stirrer 17 is installed within the waveguide 16, to evenly disperse the microwaves provided from the magnetron 14 into the cooking cavity 11. The stirrer 17 is driven by a stirrer drive motor 21 disposed between the waveguide 16 and an external wall of the body 10.

An electrical component area 12 is separated from the cooking cavity 11 by a partition 22, and is provided on a right side of the cooking cavity 11, to accommodate various electrical components therein. The magnetron 14 is installed in an upper portion of the electrical component area 12 to generate the microwaves that will be supplied into the cooking cavity 11. The microwaves generated by the magnetron 14 are supplied into the cooking cavity 11 through the waveguide 16 and the microwave supply hole 20.

A vacuum pump 13 is placed in a lower portion of the electrical component area 12 to create a vacuum state in the cooking cavity 11. The vacuum pump 13 is connected to the cooking cavity 11 through a pipe inserted into a hole formed in the partition 22 disposed between the cooking cavity 11 and the electrical component area 12.

An infrared sensor 15 is installed at a portion of the partition 22 to sense infrared rays within the cooking cavity 11, and then determine whether food is present in the cooking cavity 11.

A moisture supply container 23 is attached to another portion of the partition 22 to supply moisture into the cooking cavity 11. A magnet 24 is attached to a side of the moisture supply container 23 to enable the moisture supply container 23 to be detachable from the partition 22.

The moisture generated by the moisture supply container 23 is important because the moisture maintains the moisture of food at a desired level in a cooking mode to improve a quality of cooked food, and decreases a temperature of the cooking cavity 11 in a cold storage mode, which will be described later.

Figure 2:
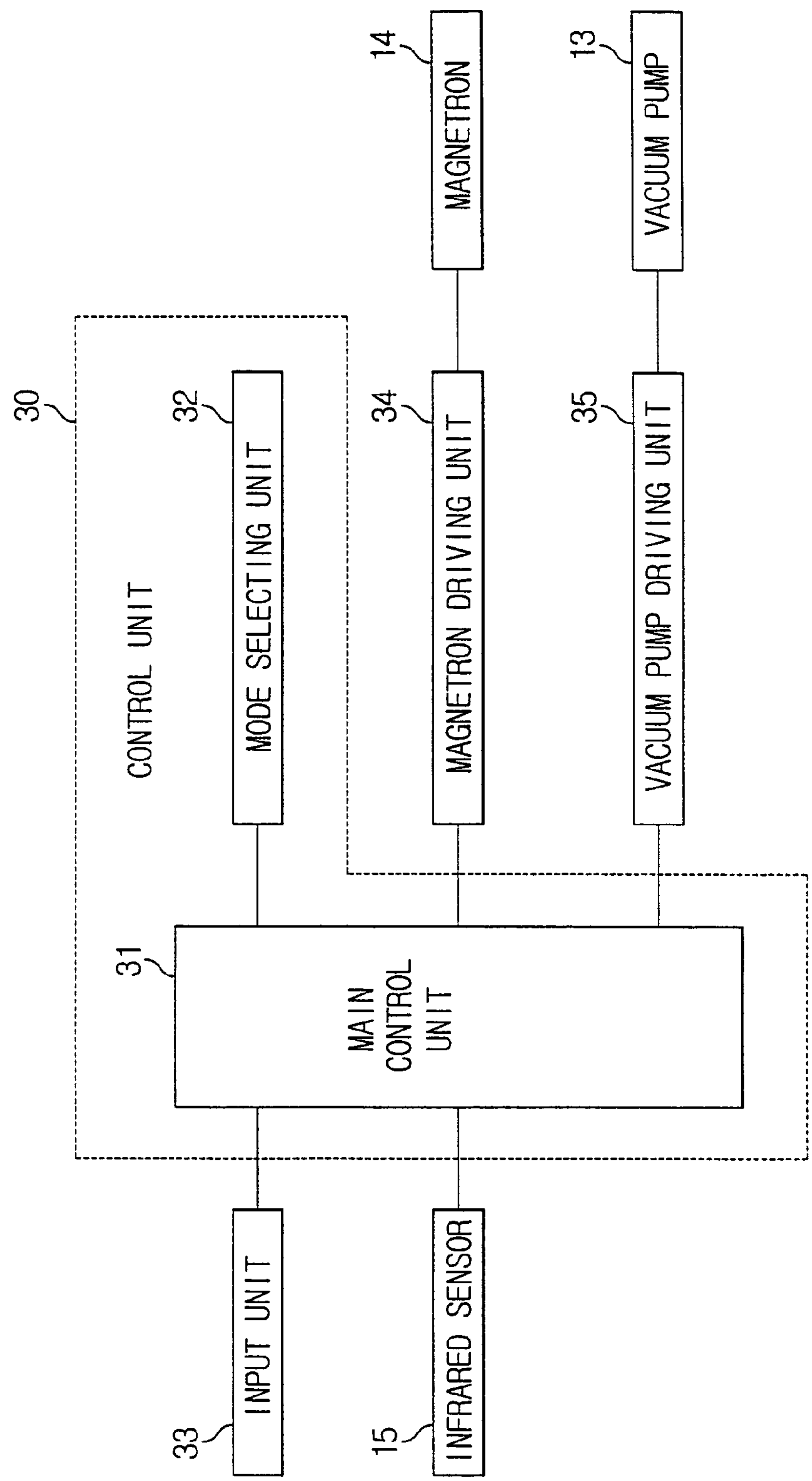
FIG. 2 is a block diagram showing a construction of the vacuum cooking apparatus of FIG. 1.

A construction of the vacuum cooking apparatus of the present invention is described in detail with reference to FIG. 2.

The vacuum cooking apparatus includes a control unit 30 with a mode selecting unit 32 and a main control unit 31. The mode selecting unit 32 selects modes to be performed by the vacuum cooking apparatus. The modes include a cold storage mode, a thawing mode, a cooking mode, and a warming mode.

The cold storage mode is used to maintain the cooking cavity 11 in a refrigeration or freezing mode, in which the refrigeration mode represents a condition in which the temperature of the cooking cavity 11 is approximately 1 to 5° C. and the freezing mode represents a condition in which the temperature of the cooking cavity is below 0° C.

The vacuum state is created in the cooking cavity 11 to implement the freezing or refrigeration mode of the cooking cavity 11. If the vacuum state is created in the cooking cavity 11, a pressure of the cooking cavity 11 is decreased, and thus a boiling point of liquid moisture contained in the food or the cooking cavity is decreased (for example, if a boiling point at 760 torr is 100° C., a boiling point at 20 torr is approximately 20° C.).

If the boiling point of the moisture is decreased, the moisture contained in the food or liquid moisture contained in the cooking cavity evaporates. Further, as the moisture evaporates, surrounding heat is absorbed, and thus the temperature of the cooking cavity, including the food, is decreased. Consequently, if a vacuum state is created in the cooking cavity, the moisture contained in the cooking cavity absorbs energy while causing a phase change, thus decreasing the temperature of the cooking cavity.

In the present invention, the moisture supply container 23 is provided to supply moisture into the cooking cavity 11, so that moisture sufficient to cause a phase change is maintained.

An amount by which the temperature of the cooking cavity 11 is decreased differs according to a vacuum level of the cooking cavity 11. Therefore, the temperature of the cooking cavity 11 may be controlled by adjusting the vacuum level of the cooking cavity 11. The vacuum level represents a level which is expressed in terms of a pressure of remaining gas.

If the food needs to be frozen, the vacuum level is increased, while if the food needs to be refrigerated, the vacuum level is decreased relative to the case where the food needs to be frozen.

In the cold storage mode, according to one aspect, the vacuum pump 13 is periodically operated. For example, if the cooking cavity 11 is set to be maintained in a refrigeration mode, the vacuum unit is continuously operated at an early stage. Further, when the temperature of the cooking cavity reaches approximately 1° C., the operation of the vacuum unit is stopped, and, after that, a procedure of operating the vacuum unit for approximately 5 minutes and stopping the operation of the vacuum unit for approximately 15 minutes is repeatedly performed.

The cold storage mode is divided into first and second cold storage modes. The first cold storage mode is used to store food at a low temperature until a predetermined cooking start time, in response to a cold storage signal output from the main control unit 31, after the food is placed in the cooking cavity 11, when a reserved cooking operation is performed. The second cold storage mode is used to store cooked food at a low temperature to prevent the deterioration of the cooked food, if it is determined that the cooked food is not taken out from the cooking cavity 11 by a predetermined time after the cooking has been completed.

The thawing mode is used to thaw frozen food before a cooking mode is performed, when the food placed in the cooking cavity 11 is in a frozen state. The thawing mode is performed by applying microwaves onto the frozen food. When the food absorbs the microwaves, water molecules within the food oscillate. Accordingly, the temperature of the food is increased, so that the food thaws. But if the thawing mode is simply performed using only the microwaves, conditions of a surface and an inside of the food differ. For example, the inside of the food is frozen and the surface thereof is thawed, and thus the temperature of the surface is excessively increased. As a result, the food is not thawed evenly.

Therefore, application of the microwaves is performed after the vacuum state is created in the cooking cavity and the temperature of the cooking cavity is decreased to suitably decrease the temperature of the surface of the food. Thus, the respective temperatures of the surface and inside of the food become equal, so that the food thaws evenly.

The cooking mode is used to perform cooking according to preset cooking conditions. In the cooking mode, the cooking is performed using microwaves.

The warming mode is used to maintain a suitable temperature of cooked food to store the cooked food so that the user may consume the cooked food at any time, in case the user does not immediately consume the cooked food after the cooking has been completed. In the warming mode, the microwaves are supplied to the cooked food to suitably maintain the temperature of the cooked food. During the warming mode, only 30% to 50% of the microwaves supplied in the cooking mode are supplied. In other words, a power level during the warming mode is approximately 30–50% of the power level during the cooking mode.

The main control unit 31 of the control unit 30 controls operation of the vacuum cooking apparatus.

The main control unit 31 is connected to the infrared sensor 15 that determines whether the cooked food is present in the cooking cavity by sensing infrared rays within the cooking cavity. If the cooked food is present in the cooking cavity even after the cooking has been completed, great variations do not occur in infrared rays sensed by the infrared sensor. However, if the cooked food is taken out from the cooking cavity at a certain time, variations occur in infrared rays sensed by the infrared sensor 15.

Therefore, if there are variations in the infrared rays sensed by the infrared sensor, it may be determined that the cooked food is taken out from the cooking cavity.

Further, the main control unit 31 is connected to a vacuum pump driving unit 35 to drive the vacuum pump 13. The vacuum pump 13 connected to the vacuum pump driving unit 35 discharges air in the cooking cavity to an outside of the cooking cavity through a pumping operation, thus creating the vacuum state in the cooking cavity. The vacuum level of the cooking cavity is determined according to a degree to which the vacuum unit is driven.

The vacuum cooking apparatus also includes an input unit 33 to input information on cooking (cooking condition, cooking start time, etc.), and a magnetron driving unit 34 to drive the magnetron 14 that generates the microwaves.

Figure 3A:
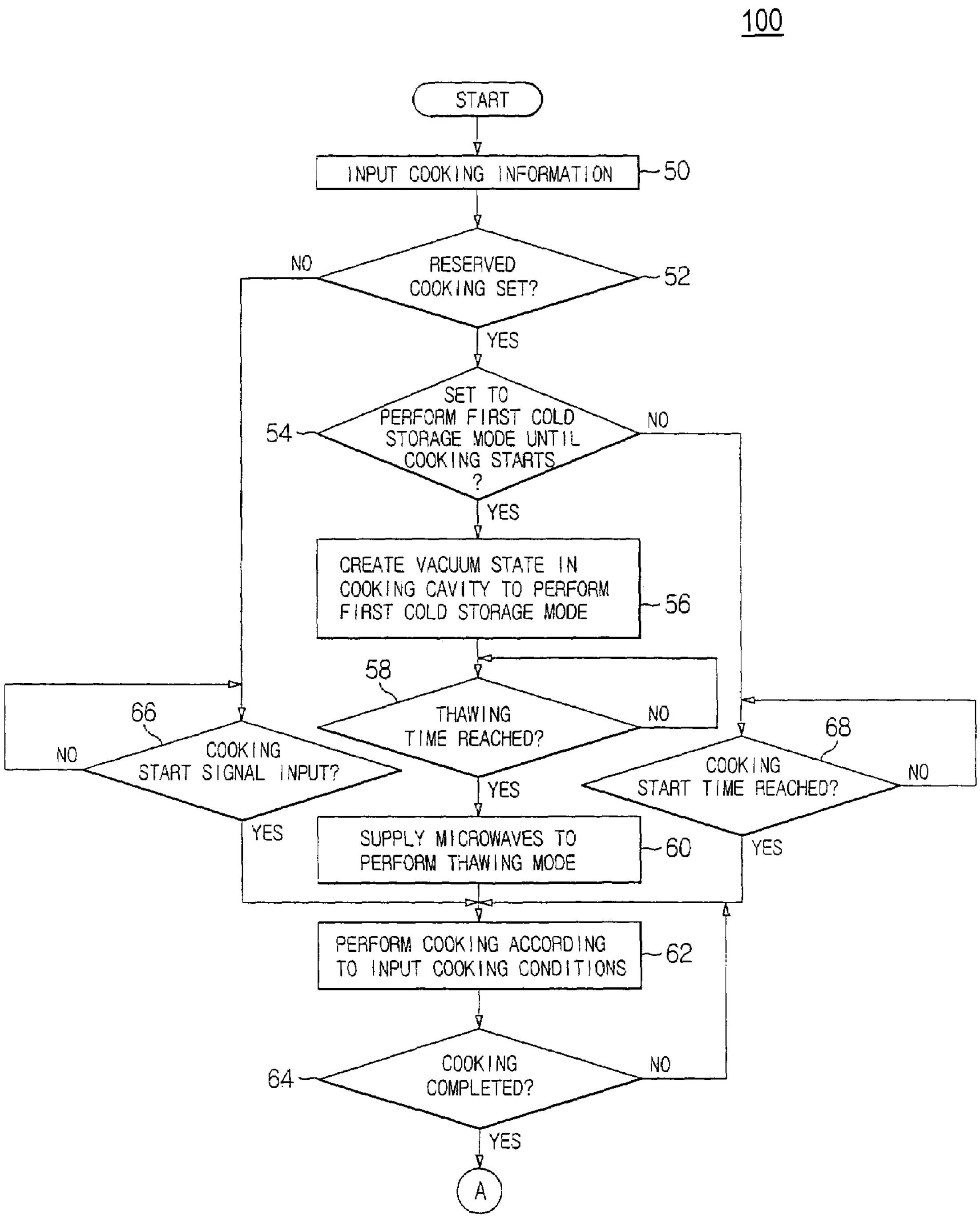
FIGS. 3A and 3B are flowcharts showing an operation of the vacuum cooking apparatus of FIG. 1.
Figure 3B:
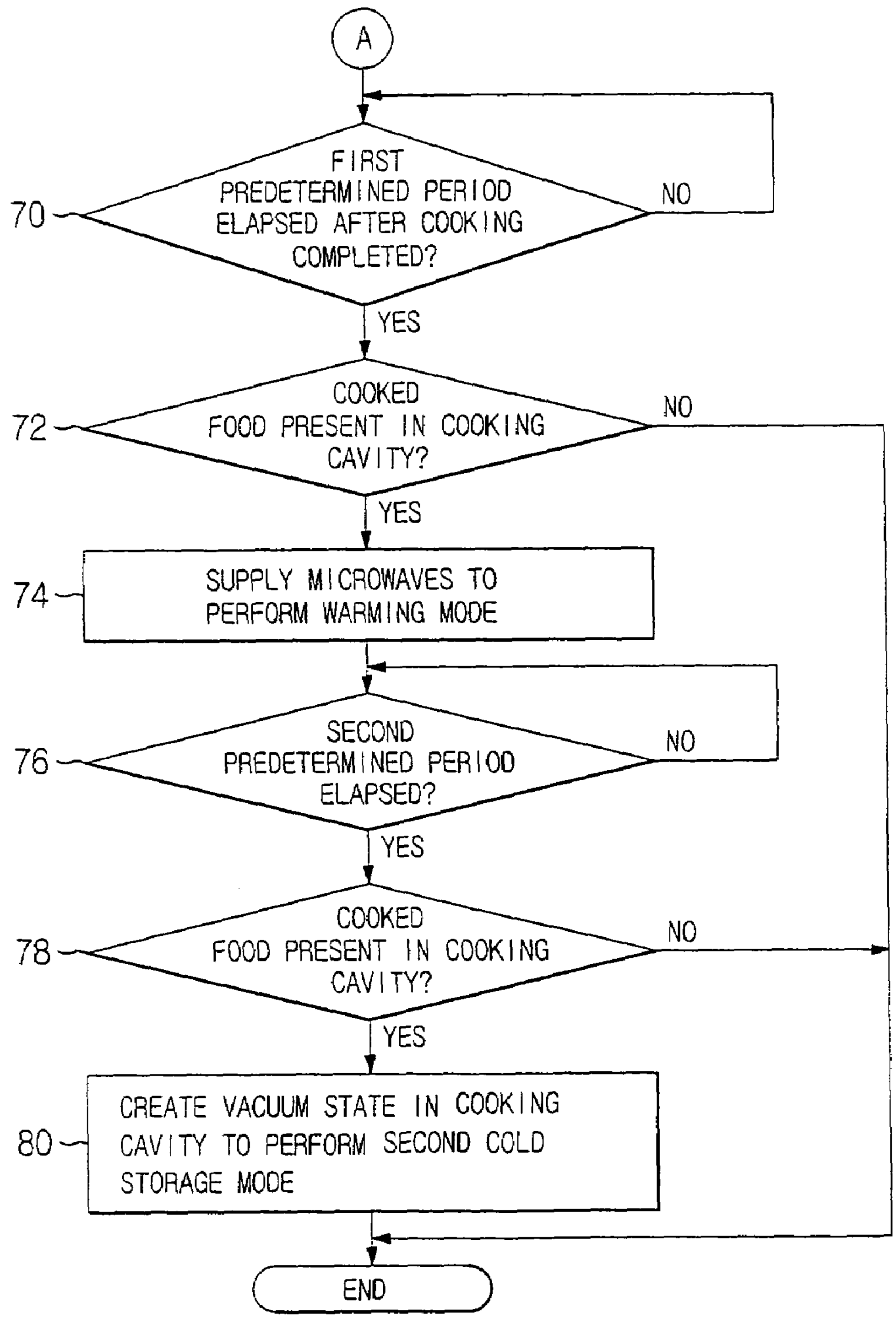

A method 100 of operation of the vacuum cooking apparatus is described with reference to FIGS. 3A and 3B.

First, cooking information is input through the input unit 33 in operation 50. The cooking information includes a cooking time, a food type and information indicating whether reserved cooking is set, and further includes a cooking start time or information indicating whether to perform a cold storage mode if the reserved cooking is set.

The reserved cooking is a mode that allows the user to input a desired cooking start time when the user inputs cooking information, and automatically performs cooking according to preset cooking information when the desired cooking start time is reached.

Next, the control unit 30 determines whether reserved cooking is set in operation 52. If the reserved cooking is not set, the control unit 30 determines whether a cooking start signal has been input in operation 66. If the cooking start signal has not been input, the control unit 30 performs operation 66 again. Once the cooking start signal has been input, then the cooking is performed according to the input cooking conditions in operation 62.

If the reserved cooking is set in operation 52, the mode selecting unit 32 determines whether a first cold storage mode (freezing or refrigeration mode) is set to be performed until the cooking starts in operation 54.

If the cooking cavity is set in either the freezing or the refrigeration mode until the cooking starts, then in operation 56, the main control unit 31 creates a vacuum state in the cooking cavity by transmitting a cold storage signal to the vacuum pump driving unit 35, thus enabling the cooking cavity to be maintained in the freezing or refrigeration mode. Whether to set the cooking cavity in the refrigeration or freezing mode is determined according to cooking information input by the user in operation 50. The cooking cavity is maintained in the refrigeration or freezing mode according to the vacuum level thereof.

In operation 58, the mode selecting unit 32 determines whether a thawing time is reached while the cooking cavity is maintained in the freezing or refrigeration mode. If the thawing time is not reached, the mode selecting unit 32 continues to perform the first cold storage mode. When the thawing time is reached, the mode selecting unit 32 performs the thawing mode for a predetermined period in operation 60. In the thawing mode, the magnetron driving unit 34 drives the magnetron 14 to thaw the food.

Further, after the thawing mode has been completed, the mode selecting unit 32 selects the cooking mode. The main control unit 31 cooks the food by supplying microwaves onto the food according to the input cooking information (cooking time, cooking type, etc.) in operation 62.

If the reserved cooking is set and the first cold storage mode is not set to be performed before the cooking starts in operation 54, the mode selecting unit 32 determines whether a cooking start time is reached in operation 68. If the cooking start time is not reached, the mode selecting unit 32 performs the operation 68 again. When the cooking start time is reached, the cooking is performed according to the input cooking conditions in operation 62.

Next, the mode selecting unit 32 determines whether the cooking has been completed in operation 64. If the cooking is not completed, the cooking is continuously performed. If the cooking has been completed, the mode selecting unit 32 determines whether a first predetermined period has elapsed from the time the cooking was completed in operation 70. The first predetermined period is preset in consideration of a time required for the user to take out the cooked food from the cooking cavity after the cooking has been completed, and according to one aspect, may be set arbitrarily.

If the first predetermined period has not elapsed after the completion of the cooking, the mode selecting unit 32 performs the operation 70 again, while if the first predetermined period has elapsed, the mode selecting unit 32 determines whether the cooked food is present in the cooking cavity in operation 72.

Determining whether the cooked food is present in the cooking cavity is accomplished using results sensed by the infrared sensor 15. If great variations do not occur in infrared rays sensed by the infrared sensor 15, it is determined that the cooked food is present in the cooking cavity. If the cooked food is taken out from the cooking cavity, the method 100 terminates. But, if the cooked food is present in the cooking cavity even after the cooking has been completed and then the first predetermined period has elapsed, the mode selecting unit 32 performs a warming mode so that the user may consume the cooked food at any time in operation 74. The warming mode is performed using the microwaves similar to the cooking mode.

While performing the warming mode, the mode selecting unit 32 determines whether a second predetermined period has elapsed in operation 76. During the second predetermined period the warming mode is maintained, and, according to one aspect, the duration of the second predetermined period may be set arbitrarily.

If the second predetermined period has not elapsed after the warming mode starts, the mode selecting unit 32 performs the operation 76 again, while if the second predetermined period has elapsed, the mode selecting unit 32 determines whether the cooked food is present in the cooking cavity using the results sensed by the infrared sensor 15 in operation 78. If the cooked food is not present in the cooking cavity, the method 100 terminates, while if the cooked food is present in the cooking cavity after the second predetermined period has elapsed, the mode selecting unit 32 performs a second cold storage mode in operation 80. In the second cold storage mode, the vacuum level of the cooking cavity is controlled to maintain the cooking cavity in the freezing or refrigeration mode.

According to one aspect, the user may select that the warming mode is not performed after the cooking has been completed, and thus, the cold storage mode would be performed immediately after a certain period has elapsed after cooking is completed.

As is apparent from the above description, the present invention provides the vacuum cooking apparatus and the cooking method 100 using the vacuum cooking apparatus, which automatically perform cold storage, thawing, cooking, and warming functions in a single cooking apparatus, thus increasing cooking convenience. Additionally, the vacuum cooking apparatus stores cooked food in the cooking cavity at a low temperature for a long time after cooking has been completed, and automatically performs a preset cooking operation at a preset time, thus a user does not have to wait for a long time to perform cooking that requires a long time.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking method using a vacuum cooking apparatus, comprising:

decreasing a temperature of a cooking cavity by creating a vacuum state in the cooking cavity for a first predetermined period in response to a cold storage signal, thus performing a cold storage mode to store food at a predetermined temperature;

terminating the cold storage mode after the predetermined period has elapsed, and performing a cooking mode by heating the food; and determining whether cooked food is present in a cooking cavity after the cooking mode has been completed and a second predetermined period has elapsed, wherein the cold storage mode is implemented so that a vacuum level of the cooking cavity is adjusted to control the temperature of the cooking cavity in the cold storage mode.

2. The cooking method according to claim 1, further comprising:

performing a thawing mode to thaw food before performing the cooking mode, when the food stored at the predetermined temperature is frozen.

3. The cooking method according to claim 1, wherein: the vacuum state is implemented by a vacuum unit connected to the cooking cavity.

4. The cooking method according to claim 1, wherein: the heating is performed using microwaves.

5. A cooking method using a vacuum cooking apparatus, comprising: determining whether cooked food is present in a cooking cavity after a cooking mode has been completed and a first predetermined period has elapsed; and decreasing a temperature of the cooking cavity by creating a vacuum state in the cooking cavity when the cooked food is present in the cooking cavity after the predetermined period has elapsed, thus performing a cold storage mode to store the cooked food at a predetermined temperature.

6. The cooking method according to claim 5, wherein:

when the cold storage mode is implemented, a vacuum level of the cooking cavity is adjusted to control the temperature of the cooking cavity.

7. The cooking method according to claim 5, further comprising:

prior to performing the cold storage mode, performing a warming mode after the cooking mode has been completed.

8. The cooking method according to claim 7, wherein:

the warming mode is performed when the cooked food is present in the cooking cavity after the cooking mode has been completed and a second predetermined period has elapsed.

9. The cooking method according to claim 5, wherein: the vacuum state is implemented by a vacuum unit connected to the cooking cavity.

10. A cooking method using a vacuum cooking apparatus, comprising:

decreasing a temperature of a cooking cavity by creating a vacuum state in the cooking cavity for a first predetermined period in response to a cold storage signal, thus performing a first cold storage mode to store food at a first predetermined temperature;

performing a cooking mode by heating the food after the first predetermined period has elapsed;

determining whether cooked food is present in the cooking cavity after the cooking mode has been completed and a second predetermined period has elapsed; and decreasing the temperature of the cooking cavity by creating the vacuum state in the cooking cavity when the cooked food is present in the cooking cavity after the cooking mode has been completed and a second predetermined period has elapsed, thus performing a second cold storage mode to store the cooked food at a second predetermined temperature.

11. The cooking method according to claim 10, further comprising:

performing a thawing mode to thaw food when the food stored at the first predetermined temperature is frozen, before the cooking mode is performed.

12. The cooking method according to claim 10, wherein:

when the first and second cold storage modes are implemented, a vacuum level of the cooking cavity is adjusted to control the temperature of the cooking cavity.

13. The cooking method according to claim 10, further comprising:

performing a warming mode before the second cold storage mode is performed, after the cooking mode has been completed.

14. The cooking method according to claim 13, wherein:

the warming mode is performed when the cooked food is present in the cooking cavity after the cooking mode has been completed and a third predetermined period has elapsed.

15. The cooking method according to claim 10, wherein: the vacuum state is implemented by a vacuum unit connected to the cooking cavity.

16. The cooking method according to claim 10, wherein: the heating is performed using microwaves.

17. A vacuum cooking apparatus, comprising:

a cooking cavity to cook food;

a heating unit to heat the food;

a vacuum unit to create a vacuum state in the cooking cavity;

a sensor to determine whether there is food in the cooking cavity; and a control unit to perform a cooking mode by controlling the heating unit, and perform a cold storage mode by controlling the vacuum unit.

18. The vacuum cooking apparatus according to claim 17, wherein: the vacuum unit is a vacuum pump to discharge air from the cooking cavity.

19. The vacuum cooking apparatus according to claim 17, wherein: a heating unit is a magnetron to supply microwaves into the cooking cavity.

20. The vacuum cooking apparatus according to claim 17, further comprising:

a moisture supply container, to supply moisture to the cooking cavity.

21. The vacuum cooking apparatus according to claim 17, wherein:

during the cold storage mode, the vacuum unit is operated periodically to maintain a temperature of the cooking cavity.

22. The vacuum cooking apparatus according to claim 17, wherein: the control unit additionally performs a thawing mode, during which the vacuum unit reduces the pressure of the cooking cavity, to reduce a temperature of the cooking cavity; and the heating unit applies microwaves to frozen food.

23. A vacuum cooking apparatus, comprising:

a body with a cooking cavity;

a microwave heating source to selectively supply heat to the cooking cavity;

a vacuum pump, to selectively adjust a pressure and temperature of the cooking cavity for a plurality of operational modes; and a sensor to determine whether there is food in the cooking cavity; and a control unit automatically using data from the sensor to decide whether to perform a given operational mode.

24. The vacuum cooking apparatus according to claim 23, further comprising:

a moisture supply container, removably installed in the cooking cavity, to selectively supply moisture to the cooking cavity during cooking, and decrease a temperature of the cooking cavity during a cold storage mode.

* * * * *